(12) United States Patent
Glover

(10) Patent No.: US 6,291,603 B1
(45) Date of Patent: Sep. 18, 2001

(54) FILTRATION AND FLOW DISTRIBUTION METHOD FOR CHEMICAL REACTORS USING RETICULATED CERAMICS WITH UNIFORM PORE DISTRIBUTIONS

(75) Inventor: John N. Glover, Spring, TX (US)

(73) Assignee: Crystaphase International, Inc., Houston, TX (US)

( * ) Notice: Subject to any disclaimer, the term of this patent is extended or adjusted under 35 U.S.C. 154(b) by 0 days.

(21) Appl. No.: 09/307,506

(22) Filed: May 7, 1999

Related U.S. Application Data

(63) Continuation-in-part of application No. 09/116,863, filed on Jul. 16, 1998, now abandoned
(60) Provisional application No. 60/052,969, filed on Jul. 18, 1997.

(51) Int. Cl.⁷ ........................................................ C08F 2/00
(52) U.S. Cl. .................. 526/71; 526/64; 526/67; 422/216; 422/217; 422/191
(58) Field of Search ................. 526/67, 64, 71; 422/217, 191, 216

(56) References Cited

U.S. PATENT DOCUMENTS

| | | |
|---|---|---|
| D. 381,394 | 7/1997 | Lex, Jr. et al. . |
| 436,414 | 9/1890 | Graham . |
| 578,548 | 3/1897 | Deruelle . |
| 598,351 | 2/1898 | Staub . |
| 1,947,777 | 2/1934 | Huff et al. . |
| 2,183,657 | 12/1939 | Page . |
| 2,212,932 | 8/1940 | Fairlie . |
| 2,571,958 | 10/1951 | Slaughter et al. . |
| 2,739,118 | 3/1956 | Carey . |
| 2,919,981 | 1/1960 | Calva . |
| 3,090,094 | 5/1963 | Schwartzwalder et al. . |
| 3,151,187 | 9/1964 | Comte . |
| 3,169,839 | 2/1965 | Calva . |
| 3,208,833 | 9/1965 | Carson . |
| 3,361,839 | 1/1968 | Lester . |
| 3,423,185 | 1/1969 | Ballard et al. . |
| 3,431,082 | 3/1969 | Sellin . |
| 3,506,248 | 4/1970 | Starbuck et al. . |
| 3,685,971 | 8/1972 | Carson . |
| 3,732,078 | 5/1973 | Kassarjian . |

(List continued on next page.)

FOREIGN PATENT DOCUMENTS

| | | |
|---|---|---|
| 585 595 | 10/1933 | (DE) . |
| 0260826A1 | 3/1988 | (EP) . |
| 0719578A1 | 7/1996 | (EP) . |
| 2480137 | 10/1981 | (FR) . |
| 267877 | 4/1927 | (GB) . |
| 374707 | 7/1932 | (GB) . |
| 933124 | 8/1963 | (GB) . |

OTHER PUBLICATIONS

Rashmi Narayan; Particle Capture From Non–Aqueous Media on Packed Beds; Dept. of Chemical and Materials Engineering; Fall 1996; Edmonton Alberta.

Dr. Ken J. Mills; Ceramic Guard Bed Materials; Seminar for CatCon '98; Jun. 3–5, 1998; Akron Ohio.

Kenneth R. Butcher; Reticulated Ceramic Foam as a Catalyst Support; Seminar for CatCon '98; Jun. 3–5, 1998; Akron Ohio.

Woodward, et al.; Akzo Chemicals 'Guard Bed Technology; 1991.

(List continued on next page.)

*Primary Examiner*—David W. Wu
*Assistant Examiner*—Ling-Siu Choi
(74) *Attorney, Agent, or Firm*—Bracewell & Patterson L.L.P.

(57) ABSTRACT

A method for removing contaminants from an organic-based feed stream which includes the use of a layer of reticulated ceramic material to filter the organic-based feed stream and to provide liquid distribution upstream of the catalyst bed.

16 Claims, 7 Drawing Sheets

U.S. PATENT DOCUMENTS

| | | |
|---|---|---|
| 3,787,188 | 1/1974 | Lyon . |
| 3,844,936 | 10/1974 | Newson . |
| 3,888,633 * | 6/1975 | Grosboll et al. .................. 23/284 |
| 3,898,180 | 8/1975 | Crooks et al. . |
| 3,947,347 * | 3/1976 | Mitchell .................. 208/251 H |
| 3,960,508 | 6/1976 | Bessant et al. . |
| 3,992,282 | 11/1976 | Grosboll et al. . |
| 4,033,727 | 7/1977 | Vautrain . |
| 4,149,862 | 4/1979 | Sewell, Sr. . |
| 4,197,205 * | 4/1980 | Hirs .................. 210/275 |
| 4,285,910 | 8/1981 | Kennedy, Jr. . |
| 4,329,318 | 5/1982 | Le Grouyellec et al. . |
| 4,342,643 | 8/1982 | Kyan . |
| 4,374,020 | 2/1983 | Trevino . |
| 4,380,529 | 4/1983 | Gupta . |
| 4,568,595 | 2/1986 | Morris . |
| 4,579,647 | 4/1986 | Smith . |
| 4,615,796 * | 10/1986 | Kramer .................. 208/146 |
| 4,708,852 | 11/1987 | Helbling, Jr. et al. . |
| 4,775,460 | 10/1988 | Reno . |
| 4,788,040 | 11/1988 | Campagnolo et al. . |
| 4,830,736 | 5/1989 | Hung et al. . |
| 4,968,651 | 11/1990 | Crabtree . |
| 4,971,771 | 11/1990 | Stahl . |
| 4,985,211 | 1/1991 | Akiyama et al. . |
| 5,013,426 | 5/1991 | Dang Vu et al. . |
| 5,017,542 | 5/1991 | Martan et al. . |
| 5,143,700 | 9/1992 | Anguil . |
| 5,177,961 | 1/1993 | Whittenberger . |
| 5,202,097 | 4/1993 | Poussin . |
| 5,217,603 | 6/1993 | Inoue et al. . |
| 5,298,226 | 3/1994 | Nowobilski . |
| 5,304,423 | 4/1994 | Niknafs et al. . |
| 5,326,512 | 7/1994 | Stillwagon et al. . |
| 5,336,656 | 8/1994 | Campbell . |
| 5,368,722 | 11/1994 | Bartholdy . |
| 5,384,302 | 1/1995 | Gerdes et al. . |
| 5,399,535 | 3/1995 | Whitman . |
| 5,512,530 | 4/1996 | Gerdes et al. . |
| 5,624,547 | 4/1997 | Sudhakar et al. . |
| 5,660,715 | 8/1997 | Trimble et al. . |

OTHER PUBLICATIONS

Norton Chemical Process Products Corp.; Denstone Inert Catalyst Bed Supports; 1992; Akron Ohio.

Petro Ware, Inc.; 86 Catalyst Support Media "Premium Quality from Beginning to End"; Crooksville, Ohio.

Strom, et al.; Advanced Reticulated Ceramics; Hi–Tech Ceramics; p. 14–19.

Sweeting, et al.; Reticulated Ceramics for Catalyst Support Applications; Hi–Tech Ceramics, Inc.; Nov. 30, 1994.

Hi–Tech Ceramics; Reticel, Designing the Future with Advanced Reticulated Ceramics; Product Brochure; undated.

Ceramic Industry Cover Page and Table of Contents; vol. 147, No. 3, Mar. 1997.

Selee Corporation; Product Brochure; undated.

Saxonburg Ceramics Incorporated; Product Material Specifications; undated.

Foseco Home Page; Internet; p. 1–3; Feb. 21, 1997.

Selee Corporation Homepage; Internet.

Selee Corporation; Ceramic Foam for Thermal/Kiln Furniture Appliactions; Ceramic Foam Kiln Furniture Physical Porperty Data Sheet; Nov. 14, 1996.

NPRA Q&A Session on Refining And Petrochemical Technology; Section B. Hydrotreating; p. 85–101; 1990.

NPRA Q&A Session on Refining And Petrochemical Technology; Section B. Hydrotreating; p. 98–118; 1991.

NPRA Q&A Session on Refining And Petrochemical Technology; Section B. Hydrotreating; p. 104–135; 1992.

NPRA Q&A Session on Refining And Petrochemical Technology; Section B. Hydrotreating; p. 94–112; 1993.

NPRA Q&A Session on Refining And Petrochemical Technology; Section B. Hydrotreating; p. 98–139; 1994.

NPRA Q&A Session on Refining And Petrochemical Technology; Section B. Hydrotreating; p. 96–123; 1995.

NPRA Q&A Session on Refining And Petrochemical Technology; Section B. Hydrotreating; p. 131–160; 1996.

Koch; Reactor Internals by Koch, Your Way; undated.

Hickman, et al.; Production of Syngas by Direct Catalytic Ocidation of Methane; Science; vol. 259; p. 343–346; Jan. 15, 1993.

GKN Sinter Metals; Design Ideas and Application—Porous Discs; undated.

Sinter Metals; High Porosity SIKA–R . . . IS™, Porous Metal Filter Elements; undated.

Sinter Metals; Tool List, Seamless SIKA–Elements; undated.

Sinter Metals; High Porosity Sintered Materials; p. 1–16; undated.

Christy Refractories Company; Prox–Svers Catalyst Support Media; 4/95.

Haldor Topsoe, Inc.; Material Safety Data Sheet Inert Topping TK–10; p. 1–4; 1992.

Criterion; Top Bed Catalyst and Support; undated.

* cited by examiner

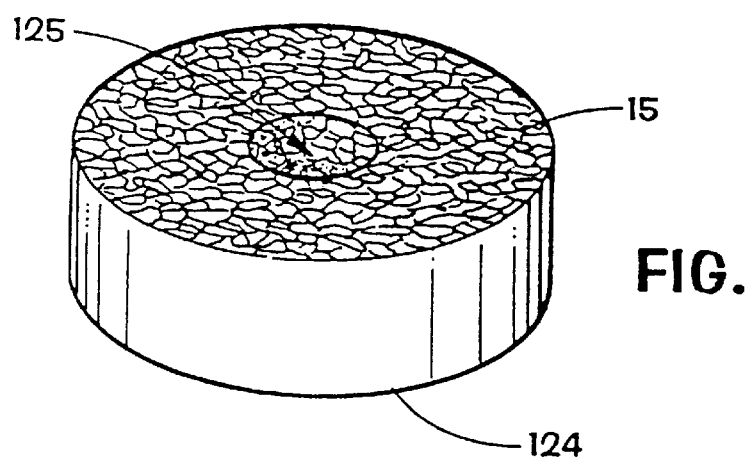
FIG. 6
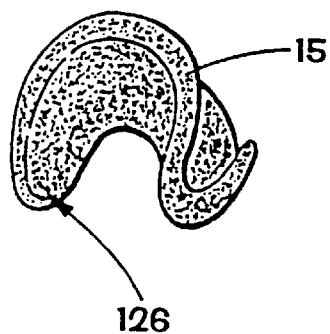
FIG. 7
FIG. 8
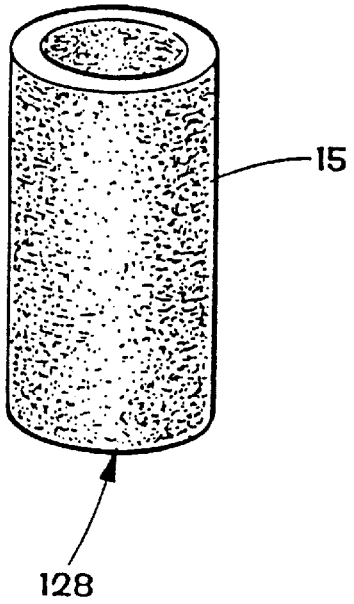
FIG. 9
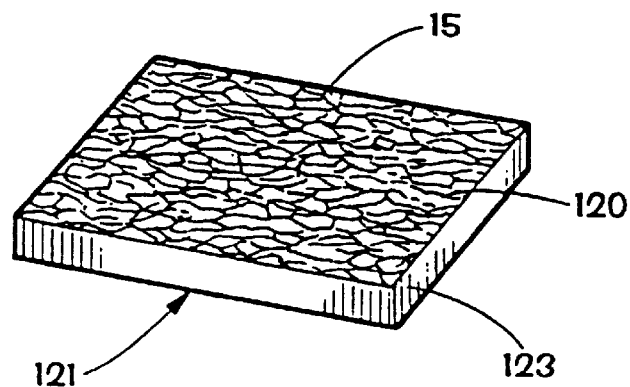

FILTRATION AND FLOW DISTRIBUTION METHOD FOR CHEMICAL REACTORS USING RETICULATED CERAMICS WITH UNIFORM PORE DISTRIBUTIONS

RELATED APPLICATIONS

This application is a C-I-P of U.S. patent application Ser. No. 09/116,863, filed Jul. 16, 1998, now abandoned, and claims benefit from U. S. Provisional Application No. 60/052,969, filed Jul. 18, 1997.

BACKGROUND OF THE INVENTION

1. Field of the Invention

The invention relates to a method of providing filtration of solids from organic-based feed streams to chemical reactors. In another aspect, this invention relates to a method for providing flow distribution of organic-based feed streams to chemical reactors. More particularly, the invention relates to a method for filtering solids and providing liquid distribution for organic-based feed streams that are subsequently processed in chemical reactors having discrete solid element catalyst bed(s). In another aspect, the invention is directed toward distributing inlet air or vapors, particularly for fluidized bed reactors. A further aspect of the invention relates to a method for partially reacting polymer precursors in organic-based feed streams to chemical reactors to reduce fouling of the solid element catalyst bed(s).

2. Description of Related Art

Typically chemical reactor beds include discrete solid catalyst particles contained in one or more fixed beds. Often these beds are supported, or retained, at their inlet and/or outlet by materials which are inert to the reaction. These inert materials may trap all or some solid contaminants such as dirt, iron oxide, iron sulfide, asphaltenes, coke fines, catalyst fines, sediments or other entrained foreign particulate material in the reactor feed stream. The trapping of the contaminants is to prevent undesirable material from plugging, poisoning or otherwise deactivating the catalyst bed. The inert materials, or inerts, traditionally used are typically made of conventional ceramic materials in the form of pellets or spheres and typically must be resistant to crushing, high temperatures and/or high pressures. In addition, these materials may facilitate distribution of the feed stream across the catalyst bed in such a manner to reduce channeling through the catalyst bed.

To increase the efficiency of the inerts, graduated layers of inerts in different sizes and shapes along with perforated discs, or screen baskets, have been used to retard the surface of a catalyst bed from becoming plugged with contaminants such as dirt, iron oxide, iron sulfide, asphaltenes, coke fines, catalyst fines, sediments, or other entrained foreign particulate material. Skimming, or removal, of the top portion of the catalyst is required when the filtering capacity of the inerts is exhausted resulting in the catalyst itself being used as a filter. In addition to catalyst fouling by particulate matter in the organic-based stream, polymerization of polymer precursors, e.g., diolefins, found in the organic-based feed stream may also foul the catalyst. In particular, two mechanisms of polymerization, free radical polymerization and condensation-type polymerization, may cause catalyst bed fouling, gumming or plugging. The addition of antioxidants to control free radical polymerization has been found useful where the organic-based feed stream has encountered oxygen. Condensation polymerization of diolefins typically occurs after the organic-based feed is heated. Therefore, filtering prior to the organic-based feed stream entering the reactor may not be helpful to remove these foulants as the polymerization reactions generally take place in the reactors.

It is highly desirable to increase the efficiency of the inert bed filtration and to control the rate of reaction of the diolefins or other polymer precursors. Thus, the development of a method of filtration that increases the efficiency of the filtering of the contaminated feed stream may also reduce the volume of inerts required to protect the catalyst bed from solid deposition, as well as reduce the pressure drop associated with plugging. The method of the present invention for filtration and flow distribution for chemical reactors, when compared with previously proposed prior art methods, has the advantages of: providing more efficient filtering; increasing catalyst life; decreasing catalyst losses; and reducing the need to take the reactor off-line for maintenance when removal or replacement of the inert material or any catalyst that is plugged is required. These benefits may result in both capital and operating savings.

Disadvantages associated with current liquid distribution designs and methods in fixed bed chemical reactors may result in poor liquid distribution to the catalyst bed. Partial plugging of the catalyst bed with contaminants, or gumming by reactive diolefins or other polymer precursors, may also cause maldistribution. The maldistribution may result in channeling and corresponding bypassing of portions of the catalyst bed, reducing the catalyst efficiency. Usually, a maldistribution problem is evidenced by radial temperature differences. Therefore, the art has sought a flow distribution method that may spread the liquid more uniformly through the catalyst bed, provide efficient filtering and reduce fouling caused by undesired polymerization reactions.

Accordingly, prior to the development of the present invention, there has been no method for filtering and/or distributing organic-based feed streams to chemical reactors which: may capture a mixture of large and small contaminants without plugging or blinding; does not cause relatively large pressure drops across the filtering and/or distribution media; does not require excessive capital and operating costs; and does not cause process safety and environmental concerns arising from maintenance required shutdowns and start-ups. Therefore, the art has sought a method for extending the run life of catalyst beds by filtering and distributing organic-based feed streams to chemical reactors which: does not require excessive amounts of catalyst; does not require the use of relatively large amounts of inert material; does not cause relatively large pressure drops across the bed; does not require relatively large capacity circulation pumps or compressors; and does not cause process safety and environmental concerns arising from reactor shutdowns and start-ups.

SUMMARY OF INVENTION

In accordance with the invention, the foregoing advantages have been achieved through the present method of filtering and distributing an organic-based feed for chemical reactors. The present invention for removing contaminants from an organic-based feed stream may include the steps of providing a layer of reticulated ceramic material in a chemical reactor, the layer of reticulated ceramic material being in an amount sufficient to filter some or all of the contaminants from the organic-based feed stream; and passing the organic-based feed stream through the layer of reticulated ceramic material. The reticulated ceramic material may be made from any commercially available materials, for example, ZTA. The ZTA may have a product composition of $ZrO_2/Al_2O_3$ and is available from SELEE Corporation headquartered in Hendersonville, N.C. The organic-based feed stream may be an organic-based liquid, a vapor phase, or both, and the contaminants may include dirt, iron oxide, iron sulfide, asphaltenes, coke fines, catalyst fines, sediments or other entrained foreign particulate matter, or polymer precursors such as diolefins. The reticulated ceramic material should be provided in a layer in an amount sufficient to remove some or all of the contaminants from the organic-based feed stream. Another feature of the present invention for removing contaminants from a contaminated organic-based feed stream in a chemical reactor includes the steps of providing a layer of reticulated ceramic material in the chemical reactor and contacting the contaminated organic-based feed stream with the reticulated ceramic material to remove the contaminants from the contaminated organic-based feed stream. Another feature of the present invention may include the step of providing a decontaminated organic-based feed stream for further processing.

More particularly, the invention relates to a process for improving feed quality of organic-based feed streams to chemical reactors. Preferably, the chemical reactors use discrete solid element catalyst beds. The chemical reactors may include hydrotreater, hydrorefiner, hydrocracker, reformer, alkylation, isomerization, and polymerization reactors. The discrete solid catalyst particles may be contained in one or more fixed beds and in either an upflow, downflow or radial flow design.

In accordance with another aspect of the present invention, the present method of flow distribution in a chemical reactor includes the steps of: providing a layer of reticulated ceramic material in the chemical reactor, the reticulated ceramic material having a plurality of web members defining a plurality of flow passageways through the reticulated ceramic material; contacting an organic-based feed stream with the layer of reticulated ceramic material; and subdividing the organic-based feed stream into a plurality of smaller fluid streams by passing the organic-based feed stream through the plurality of flow passageways defined by the web members of the reticulated ceramic material. A further feature of this aspect of the present invention may include the steps of removing contaminants from a contaminated organic-based feed stream; and providing a decontaminated and uniformly spread organic-based feed stream to a catalyst bed for further processing in the chemical reactor.

An additional feature of the present invention may include the step of using reticulated ceramics in a variety of shapes and porosities. The shapes may include substantially spherical-shaped balls, raschig rings, saddles, hollow cylinders, perforated disks, disks, single sheets, and solid cylinders, among others. Each shape may be sized to individual specifications. Sizes for the shapes used may include substantially spherical balls of about ⅛ to 2-inch diameters; raschig rings with inside diameters of about ⅛ to 1 inch and outside diameters of about ¼ to 1½ inches, and heights of about ¼ to 2 inches; saddle shapes with radii of about ¼ to 2 inches; hollow cylinders having inside diameters of about ⅛ to 1¼ inches, outside diameters of about ¼ to 2 inches, and heights of about ¼ to 3 inches; and solid cylinders having diameters of about ⅛ to 1 inch and heights of about ¼ to 2 inches. Custom-made one-piece disks or single sheet construction may be custom-fit to the physical configuration of a reactor. A further feature of this aspect of the present invention is that the reticulated ceramic material may be formed in either a disk or single sheet, each optionally having perforations. An additional feature of the present invention is that the reticulated ceramic material when constructed may be formed into a plurality of segments in order to form an assembled sheet or disk that is custom-fit to the reactor's physical configuration. Porosities of the reticulated ceramic material may range from 10 to 800 pores per linear inch ("ppi"). Preferably the pore distribution may range from about 10 to 80 ppi. More preferably, the pore distribution may range from about 20 to 60 ppi. This enables customization of the size and shape of the reticulated ceramic material for the application, particulate loading and pressure drop constraints.

In accordance with another aspect of the present invention, entrance losses may be reduced for vapor feed streams to chemical reactors, preferably fluidized bed reactors. This advantage of the present invention may be achieved by reducing the turbulence in the vapor and air inlets to the reactors. This aspect of the present invention may include the steps of: providing a layer of reticulated ceramic material in a vapor inlet to the chemical reactor, the reticulated ceramic material having a plurality of web members defining a plurality of flow passageways through the reticulated ceramic material; passing a vapor feed stream through the vapor inlet to the chemical reactor with the reticulated ceramic material; subdividing the feed stream into a plurality of smaller fluid streams by passing the feed stream through the plurality of flow passageways defined by the web members of the reticulated ceramic material; and discharging the streamlined vapor feed stream into the chemical reactor. The method of the present invention for distributing turbulent air or vapor flows to a reactor inlet has the advantages of reducing maldistribution and entrance losses, thus allowing for reduced compressor horsepower usage or allowing for larger flow rates, depending on the process constraints of the compressor and associated piping.

In accordance with another aspect of the present invention, the step of contacting the contaminated organic-based feed stream with the reticulated ceramic material may include depositing a catalyst on the reticulated ceramic material prior to contacting the contaminated organic-based feed stream. Another feature of this aspect of the present invention may include the use of a reticulated ceramic material as a substrate having a substantially uniform coating of a selected catalyst including a porous alumina coating with a Group VI-B metal or a Group VIII metal, or both. Preferably, the Group VI-B metal is molybdenum and preferably, the Group VIII metal is either nickel or cobalt. More preferably, the Group VI-B metal and Group VIII metal are impregnated into the reticulated ceramic material. The method of the present invention is useful to extend the run life of the catalyst bed. The catalytically active reticulated ceramic material may be utilized to react diolefins or other polymer precursors and also to act as a filter and distributor. By filtering solids and partially reacting any polymer precursors, e.g., diolefins, fouling of the bed is reduced, effectively extending the run time of the reactor.

In accordance with another aspect of the present invention, the filtration method may include the step of retaining the solid particulate catalyst or sediments that form in a chemical reactor in order to reduce catalyst losses and fouling or plugging of downstream equipment. This aspect of the present invention may include the steps of: providing a layer of reticulated ceramic material; contacting an organic-based feed stream containing the catalyst material with the reticulated ceramic material; removing the catalyst material from the organic-based feed stream; and providing a relatively catalyst-free organic-based stream for further processing.

The method of the present invention for filtering organic-based feed streams in chemical reactors, when compared with prior art methods, has the advantages of: reducing the volume of inert materials required; lowering capital costs; improving the filtration of the solid particular matter from the feed streams; decreasing the pressure drop across the system; increasing run time of the reactor; lowering operating costs; increasing process safety; and reducing environmental concerns.

A specific embodiment of the invention described herein involves a method of removing contaminants from a contaminated organic-based feed stream in a chemical reactor, including the steps of: (a) providing a layer of reticulated ceramic material in a chemical reactor, the reticulated ceramic material having an average pore size of about 100 to about 150 microns, the layer of reticulated ceramic material being in an amount sufficient to filter the contaminant from the organic-based feed stream; and (b) passing the organic-based feed stream through the layer of reticulated ceramic material.

In another specific embodiment, the method involves removing contaminants from a contaminated organic-based feed stream in a chemical reactor, including the steps of: (a) providing a layer of a reticulated ceramic material, the reticulated ceramic material having an average pore size of about 100 to about 150 microns; and (b) contacting the contaminated organic-based feed stream with the reticulated ceramic material to remove the contaminants from the contaminated organic-based feed stream.

The aforementioned methods preferably also include the step of providing a decontaminated organic-based feed stream for further processing in the chemical reactor. The reticulated ceramic material preferably has a pore distribution range of about 300 to 700 pores per linear inch and more preferably a pore distribution range of about 450 to 600 pores per linear inch.

In an additional embodiment, the reticulated ceramic material is formed into a plurality of hollow cylinders that is placed within the chemical reactor.

Various chemical reactors can be used with the method of this invention, including a hydrotreater reactor, a hydrorefiner, a hydrocracker reactor, a reformer reactor, an alkylation reactor, an isomerization reactor and a polymerization reactor.

In yet another specific embodiment, the reticulated ceramic material has a substantially uniform coating of a selected catalyst including a porous alumina coating with one Group VI-B metal or one Group VIII metal. The Group VI-B metal can be, for example, molybdenum. The Group VIII metal can be, for example, nickel or cobalt. The Group VI-B metal or a Group VIII metal can be impregnated into the reticulated ceramic material.

The reticulated ceramic material preferably includes a porous inorganic oxide selected from the group consisting of alumina, silica, silica-alumina, magnesia, silica-magnesia, titania and zirconium.

Still another specific embodiment of this invention involves a method of fluid distribution in a chemical reactor including the steps of: (a) providing a layer of reticulated ceramic material in the chemical reactor, the reticulated ceramic material having an average pore size of about 100 to about 150 micons defined by a plurality of web members forming a plurality of flow passageways through the reticulated ceramic material; (b) contacting an organic-based feed stream with the layer of material; and (c) subdividing the organic-based feed stream into a plurality of smaller fluid streams by passing the organic-based feed stream through the plurality of flow passageways formed by the web members of the reticulated ceramic material. The method may also include the steps of: removing contaminants from a contaminated organic-based feed stream; and providing a decontaminated and uniformly spread organic-based feed stream to a catalyst bed for further processing in the chemical reactor. The method can also include the additional steps of providing a hydrogen rich stream to contact the organic-based feed stream; and removing iron particulates and organically bound iron form a contaminated organic-based feed stream.

In yet another specific embodiment, this invention involves a method of removing organically bound iron contaminants from an organic-based feed stream comprising contacting the feed stream in the presence of hydrogen with a layer of reticulated ceramic material, the reticulate ceramic material having an average pore size of about 100 to about 150 microns, and organic-based feed stream being selected from the group consisting of organically bound iron contaminated petroleum crude oil, topped or reduced crude oil, solvent deasphalted oil, distillate, heavy cycle stocks, visbreaker liquid effluent, atmospheric and vacuum crude tower bottoms, shale oils, coal tars and tar sand oils.

BRIEF DESCRIPTION OF DRAWINGS

In the drawings:

FIG. 6 is a perspective view of a perforated disk made of reticulated ceramic material in accordance with the present invention;

FIG. 7 is a perspective view of a saddle made of reticulated ceramic material in accordance with the present invention;

FIG. 8 is a perspective view of a hollow cylinder made of reticulated ceramic material in accordance with the present invention;

FIG. 9 is a perspective view of an example of a one-piece sheet made of reticulated ceramic material in accordance with the present invention;

While the invention will be described in connection with the preferred embodiment, it will be understood that it is not intended to limit the invention to that embodiment. On the contrary, it is intended to cover all alternatives, modifications, and equivalents, as may be included within the spirit and the scope of the invention as defined by the appended claims.

DETAILED DESCRIPTION AND SPECIFIC EMBODIMENTS

Figure 1:
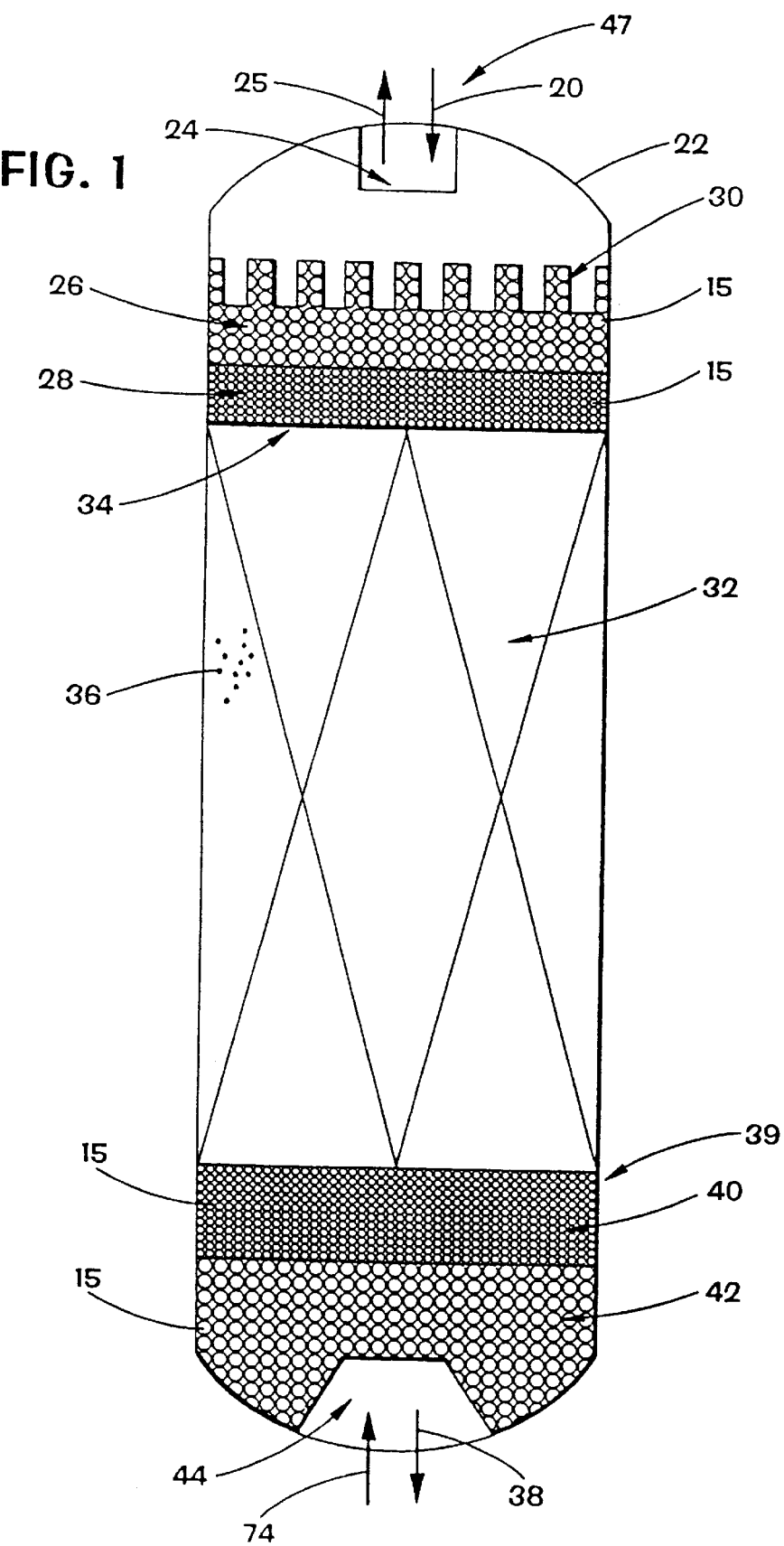
FIG. 1 is partial a cross-sectional side view of a single fixed bed chemical reactor showing a specific embodiment of the present invention.
Figure 11:
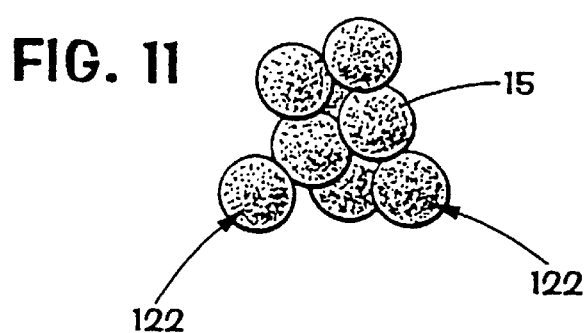
FIG. 11 is a perspective view of balls made of reticulated ceramic material in accordance with the present invention.

With reference to FIG. 1, for treatment of an organic-based feed stream a single fixed bed chemical reactor 22 with reticulated ceramic material 15 in the shape of substantially spherical balls 122 (FIG. 11) will be described, although as previously discussed other shapes of the reticulated ceramic material 15 may be used. If the reactor 22 is of a downflow configuration, the contaminated organic-based feed stream 20 will enter the reactor 22 at the inlet 24. The invention may be used in either fixed beds or fluidized bed chemical reactors. Preferably, the present invention is used in one or more fixed beds, in either an upflow or downflow or radial flow configuration. Preferably, the chemical reactors include hydrotreater, hydrorefiner, hydrocracker, reformer, alkylation, isomerization and polymerization reactors. Contaminants typically found in the feed stream include dirt, iron oxide, iron sulfide, asphaltenes, coke fines, catalyst fines, sediments or other entrained foreign particulate material. A layer 26, preferably layers 26, 28, of reticulated ceramic material 15 is provided in the vessel in an amount sufficient to filter the contaminants from the organic-based feed stream 20. Preferably, multiple layers 26, 28 may be provided wherein the size of the articles of reticulated ceramic material 15 such as balls 122 is graduated from a larger size in layer 26 to a smaller size in layer 28 as the incoming organic-based feed stream flows through the reticulated ceramic material 15. The reticulated ceramic material may be made from any commercially available materials, for example, ZTA. The ZTA may have a product composition of $ZrO_2/Al_2O_3$ and is available from SELEE Corporation headquartered in Hendersonville, N.C. The graduated sizing of the reticulated ceramic material 15 from large sizes to small sizes lessens the pressure drop through the reactor attributable to filtering of the suspended solids. Optionally, the pore size of the reticulated ceramic material may also be graduated from large pores (low ppi) to small pores (high ppi) to lessen the pressure drop through the reactor attributable to filtering of the suspended solids. Optionally, the present invention may be practiced with or without conventional basket screens 30.

Still with reference to FIG. 1, unless otherwise noted, in addition to filtering the contaminated organic-based feed stream 20, the reticulated ceramic material 15 may also enable a uniform distribution and flow of the incoming organic-based feed stream 20 to the catalyst bed 32. By passing the organic-based feed stream through a plurality of flow passageways 120 (FIG. 9) defined by web members 123 (FIG. 9) of the reticulated ceramic material 15 in layers 26, 28, the incoming organic-based feed stream 20 may also be distributed by subdividing the incoming organic-based feed into a plurality of smaller fluid streams and then resubdividing, a plurality of times, the smaller streams so that the incoming organic-based feed stream is spread uniformly across the fluid entry cross-section 34, taken along line 34—34, of the catalyst bed 32. The organic-based feed stream 20 is reacted in the catalyst bed 32. Preferably the catalyst bed 32 contains discrete solid catalyst particles 36.

The reticulated ceramic material 15 may be used to filter and retain catalyst 36 from the outgoing reacted organic-based stream 38. Small particles of the catalyst material 36 which may be entrained in the reacted organic-based stream may be filtered, or captured, from the reacted organic-based stream 38 and retained by reticulated ceramic material layers 40, 42. Preferably, the size of the reticulated ceramic material in layers 40, 42 is graduated from a smaller size in layer 40 to a larger size in layer 42 at the outlet 44 of the reactor 22 to effectively retain the catalyst 36. In addition, sediments of material may form in the reactor bed, e.g., sediments formed by excessive hydrocracking of residual oils, that may plug or foul downstream equipment. These sediments may be filtered from the outgoing reacted organic-based stream 38 by the reticulated ceramic material 15. Preferably, the size of the reticulated ceramic material in layers 40, 42 is graduated from a smaller size in layer 40 to a larger size in layer 42 at the outlet 44 of the reactor 22 to effectively retain the catalyst 36, while the pore size of the reticulated ceramic material is inversely graduated, preferably about 10 to 30 ppi to filter the sediments. More preferably, the pore size range is about 40 to 80 ppi. Alternately, the invention may also be used in an upflow reactor configuration wherein the contaminated organic-based feed 46 would instead enter the vessel at the outlet 44 at the lower end 39 and the reacted organic-based stream 25 would exit the reactor at the inlet 24 at the upper end 47 of reactor 22.

As previously discussed, another advantage of the present invention is to react partially activated or activated reticulated ceramic material 15 with polymer precursors in a contaminated organic-based feed stream 20. Condensation polymerization of diolefins may occur in the reactor bed 32 after the contaminated organic-based feed stream 20 is heated, generally prior to introduction into the chemical reactor 22, thereby forming foulants in the reactor bed 32 itself which may gum or plug the bed 32. As the foulants form in the bed, they cannot be filtered from the contaminated organic-based feed stream 20 before flowing across the fluid entry cross-section 34. Therefore, the layer or layers 26, 28, 40, 42 of reticulated ceramic material 15 may be coated with an alumina powder which may also act as a substrate for catalyst materials to form partially activated reticulated ceramic material. As used herein, an "activated support" means a reticulated ceramic material which has been impregnated with catalyst materials, or a reticulated ceramic material which may be an oxide, nitride, or carbide of a metal or a reticulated ceramic material which contains zeolite or inorganic oxides, e.g., alumina, silica, silica-alumina, magnesia, silica-magnesia or titania. As used herein, a "partially activated support" means an activated support material which has been purposefully made less active or partially deactivated in order to achieve a slower reaction rate or to partially react the materials contacted.

Coated reticulated ceramic material 15 may also be used, wherein the coating may comprise one of several conventional catalysts. Alumina may be used as an active coating, optionally but preferably, alumina may be used as a support. The catalyst according to this invention preferably comprises a metal of Group VI-B or a member of Group VIII, or both, impregnated into an alumina-based support. Accordingly, the catalyst may comprise at least one of chromium, molybdenum and tungsten in combination with at least one of iron, nickel, cobalt, platinum, palladium and iridium. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight.

Figure 2:
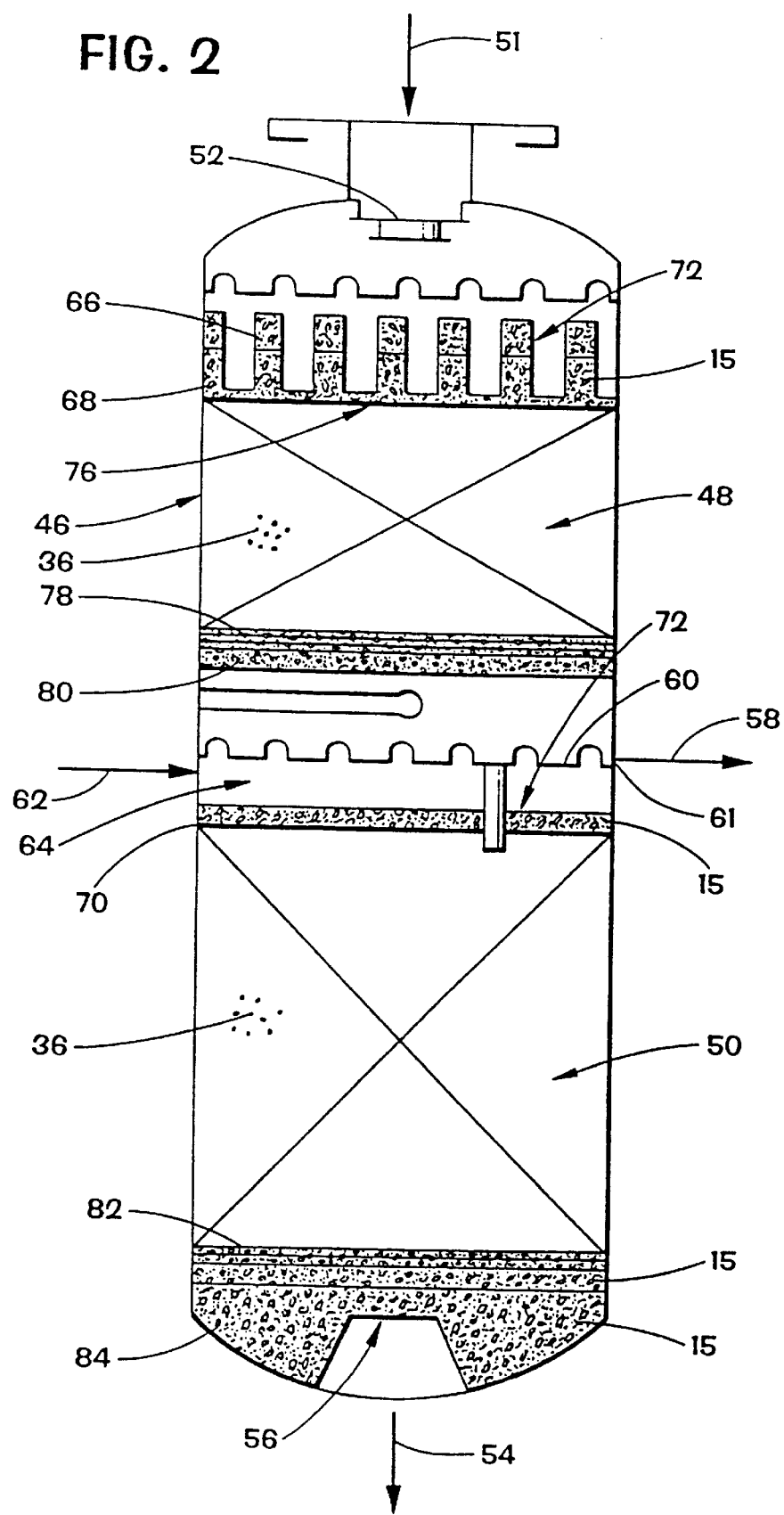
FIG. 2 is a partial cross-sectional side view of a multiple fixed bed chemical reactor showing another embodiment of the present invention.

With reference to FIG. 2, a multiple fixed bed chemical reactor 46 having two fixed catalyst beds 48, 50 with reticulated ceramic material 15 in the shape of saddles 126 (FIG. 7) will be described. The reactor 46 is illustrated in a downflow configuration, wherein the contaminated organic-based feed stream 51 will enter the reactor 46 at the inlet 52 and the reacted organic-based stream 54 will exit the reactor at the outlets 56, 60. A partially reacted organic-based stream 58 may be accumulated at the outlet 61 of the first fixed bed 48 and withdrawn at the collector tray 60. The partially reacted organic-based stream 58 may be heated or quenched or otherwise treated before reintroduction into the reactor 46 as a partially reacted organic-based feed stream 62 at the mixing chamber 64. The partially reacted organic-based stream 58 may be removed for redistribution, heating, or other processing steps as required before reintroducing the partially reacted organic-based feed stream 62 into the reactor 46 for reaction with a succeeding catalyst bed 50. An additional layer 70 of reticulated ceramic material 15 may be provided for filtration and distribution to remove any contaminants entrained from or formed by the processing equipment used in the additional processing steps such as dirt, iron oxide, iron sulfide, asphaltenes, coke fines, catalyst fines, sediments, or other entrained foreign particulate material.

Layers 66, 68, 70 of reticulated ceramic material 15 are provided in the reactor 46 below the inlet 52 and mixing chamber 64 in an amount sufficient to filter the organic-based feed stream 51 and the partially reacted organic-based feed stream 62. Preferably, the multiple layers 66, 68, 70 are provided such that the size of the reticulated ceramic material 15 is graduated from a larger size in layer 66 to a smaller size in layer 68 as the incoming contaminated organic-based feed flows through the reticulated ceramic material 15. Optionally, the present invention may be practiced with or without conventional basket screens 72. Preferably, the fixed catalyst beds 48, 50 contain discrete solid catalyst particles 74.

As previously discussed, an advantage of the present invention is that it may also be used to distribute the organic-based feed stream. The organic-based feed stream 51 may also be distributed while being filtered by subdividing the incoming organic-based feed into a plurality of smaller fluid streams by passing the organic-based feed stream through a plurality of flow passageways 120 (FIG. 9) defined by the web members 123 (FIG. 9) of the reticulated ceramic material 15; then resubdividing, a plurality of times, the smaller streams so that the incoming organic-based feed stream is spread uniformly across the fluid entry cross-section of the catalyst bed 76. The organic-based feed 51 is then reacted in the catalyst bed 48, before being withdrawn as a partially reacted organic-based stream 58 at the collector plate 60. The method of filtration and distribution is then repeated for the partially reacted organic-based feed stream 62 as it flows into the mixing chamber 64 and passes through the reticulated ceramic material layer 70.

Another feature of the present invention is that the reticulated ceramic material 15 may also be used to capture and retain catalyst particles 74 from the outflowing partially reacted organic-based stream 58 and the reacted organic-based stream 54. The small reticulated ceramic material saddles 126 in layers 78, 80 at the outlet 61 of the first fixed bed 48 and the small saddles 126 in layers 82, 84 at the outlet 56 of the second fixed bed 50 are used to filter and retain catalyst particles 74 which may be entrained in the partially reacted organic-based stream 58 or reacted organic-based stream 54. As discussed with reference to FIG. 1, for capturing and retaining catalyst 74 from a partially reacted or a reacted outflowing organic-based stream in either a single or a multiple fixed bed chemical reactor, the reticulated ceramic material 15 is preferably graduated from small to larger sizes as shown in FIG. 2 for layers 78, 80 and 82, 84, respectively for each bed 48, 50. Optionally, the pore size of the reticulated ceramic material may also be graduated from small pores to large pores. Alternatively, the pore size of the reticulated ceramic material may be inversely graduated from large pores to small pores to filter sediments that may form in the catalyst bed.

A further advantage of the present invention is that the reticulated ceramic material 15 may be activated or impregnated with catalyst to react with polymer precursors in organic-based feed streams 51, 62. As depicted in FIG. 2, layers 66, 68, 70 of reticulated ceramic material 15 may contain an activated support including inorganic oxides preferably selected from the group consisting of alumina, silica, silica-alumina, magnesia, silica-magnesia or titania or zeolites preferably selected from the group consisting of zeolite L, zeolite X, and zeolite Y, which may be added to the reticulated ceramic material as a substrate for catalyst materials. Optionally, the reticulated ceramic material may be impregnated with catalyst materials or the reticulated ceramic material may be an oxide, nitride, carbide or boride of a metal as disclosed in U.S. Pat. No. 5,399,535, which is hereby incorporated by reference to the extent it is not inconsistent with the present invention.

Activated or partially activated reticulated ceramic material as described above may be used to control the hydrogenation rate of the diolefins or other polymer precursors to prevent fouling or gum formation. When endothermic reactions require the addition of heat to the partially reacted organic-based stream 58, preferably the reticulated ceramic material 15 of layer 70 is also activated or partially activated. The invention may also be practiced with coated reticulated ceramic material, wherein the coating may comprise one of several conventional catalysts. Alumina may be used on an active coating or support. The catalyst according to this invention preferably comprises a metal of Group VI-B or a member of Group VIII, or both, impregnated into the reticulated ceramic material, inorganic oxide or zeolite. Accordingly, the catalyst may comprise at least one of chromium, molybdenum and tungsten in combination with at least one of iron, nickel, cobalt, platinum, palladium and iridium. Of the Group VI-B metals, molybdenum is most preferred. The catalyst preferably will contain from about 2% to about 14% by weight of Group VI-B metal. Of the Group VIII metals, nickel and cobalt are most preferred. The amount of Group VIII metal in the catalyst is preferably from about 0.5% to about 10% by weight.

Figure 3:
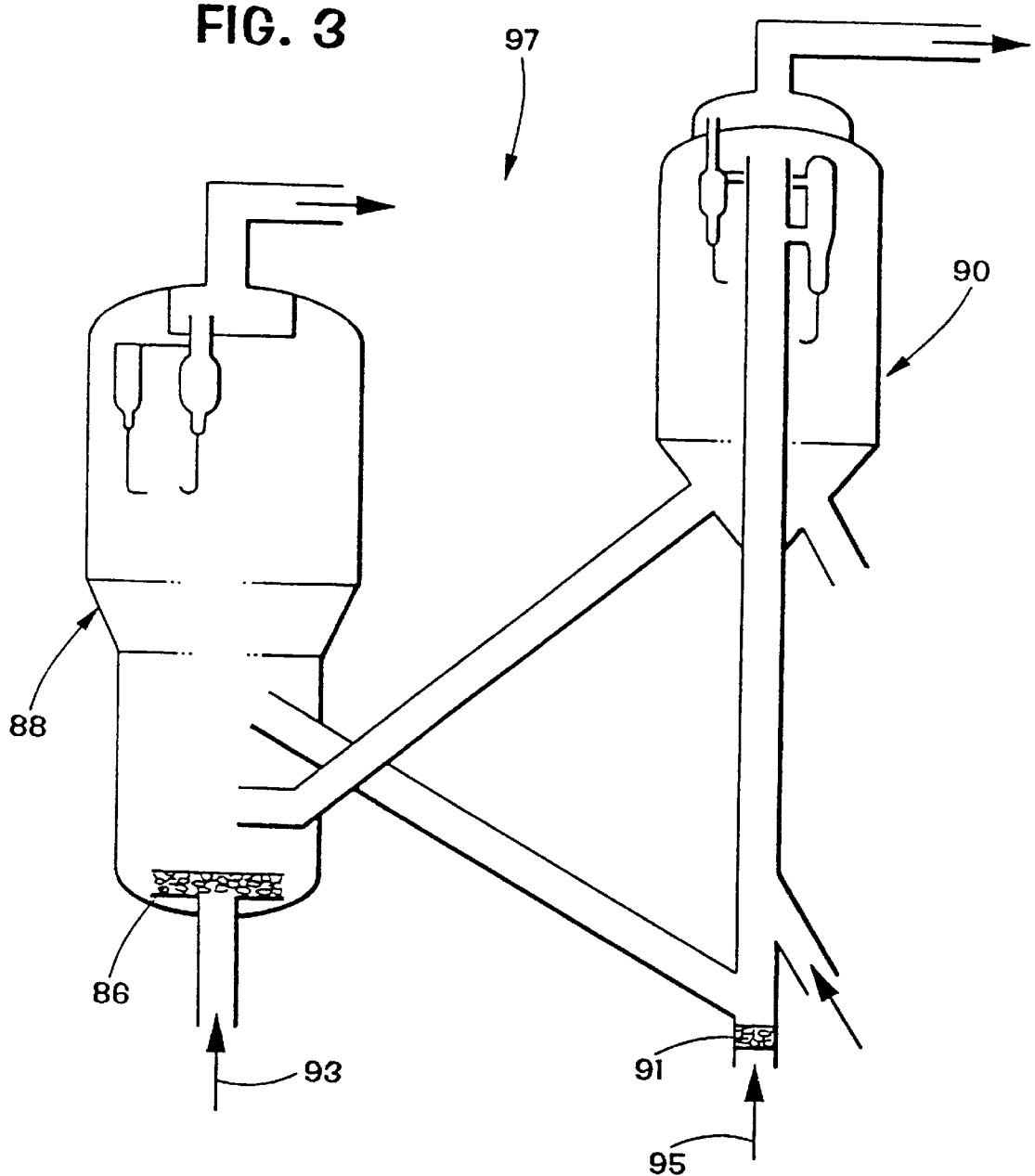
FIG. 3 is a partial cross-sectional side view of a combustor-style regenerator fluidized bed reactor.
Figure 10:
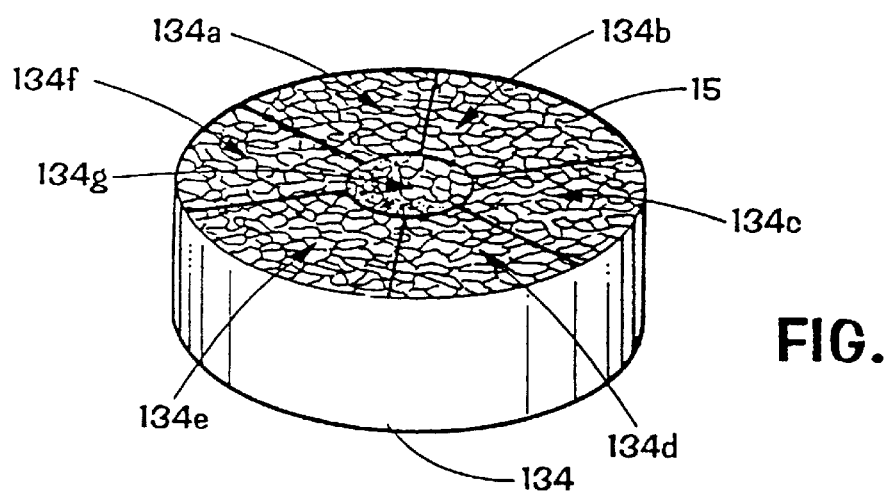
FIG. 10 is a perspective view of an assembled disk made of reticulated ceramic material in accordance with the present invention.

FIG. 3 illustrates a conventional combustor-style fluidized bed reactor 88, 90. Layers 86, 92 of reticulated ceramic material 15 may be used in fluidized bed chemical reactors 90 and in a combustor, or regenerator 88, to reduce entrance losses and maldistribution of the vapor or air flows. The inlet air 94 to the combustor or regenerator 88 is flowed through the reticulated ceramic material layer 86 to subdivide the stream into a plurality of smaller flowing streams. The reticulated ceramic material 15 may be a single circular disk 124 (FIG. 6) without the illustrated perforation 125; however it may be an oval or square sheet 121 (FIG. 9), or any geometric configuration desired including an assembled disk 134 (FIG. 10). Optionally, multiple disks 86, 92 (FIG. 3) may be used. Also, the disk 124 (FIG. 7) or sheet 121 (FIG. 9) may optionally contain perforations. The subdivision of the vapor or air flows may reduce the turbulence of the incoming vapor or air streams, thus reducing the compressor horsepower usage or allowing for an increase in flow rate, depending on the process constraints of the particular combustor-style fluidized bed reactor (FIG. 3). A further advantage of the present invention is that the subdivided vapor or air flows may more uniformly distribute the vapor or air 94 throughout the combustor or regenerator 88. In addition, another layer 92 of reticulated ceramic material 15 may be used to uniformly distribute any fluffing vapors 96 used in the fluidized bed reactor 90.

Figure 4:
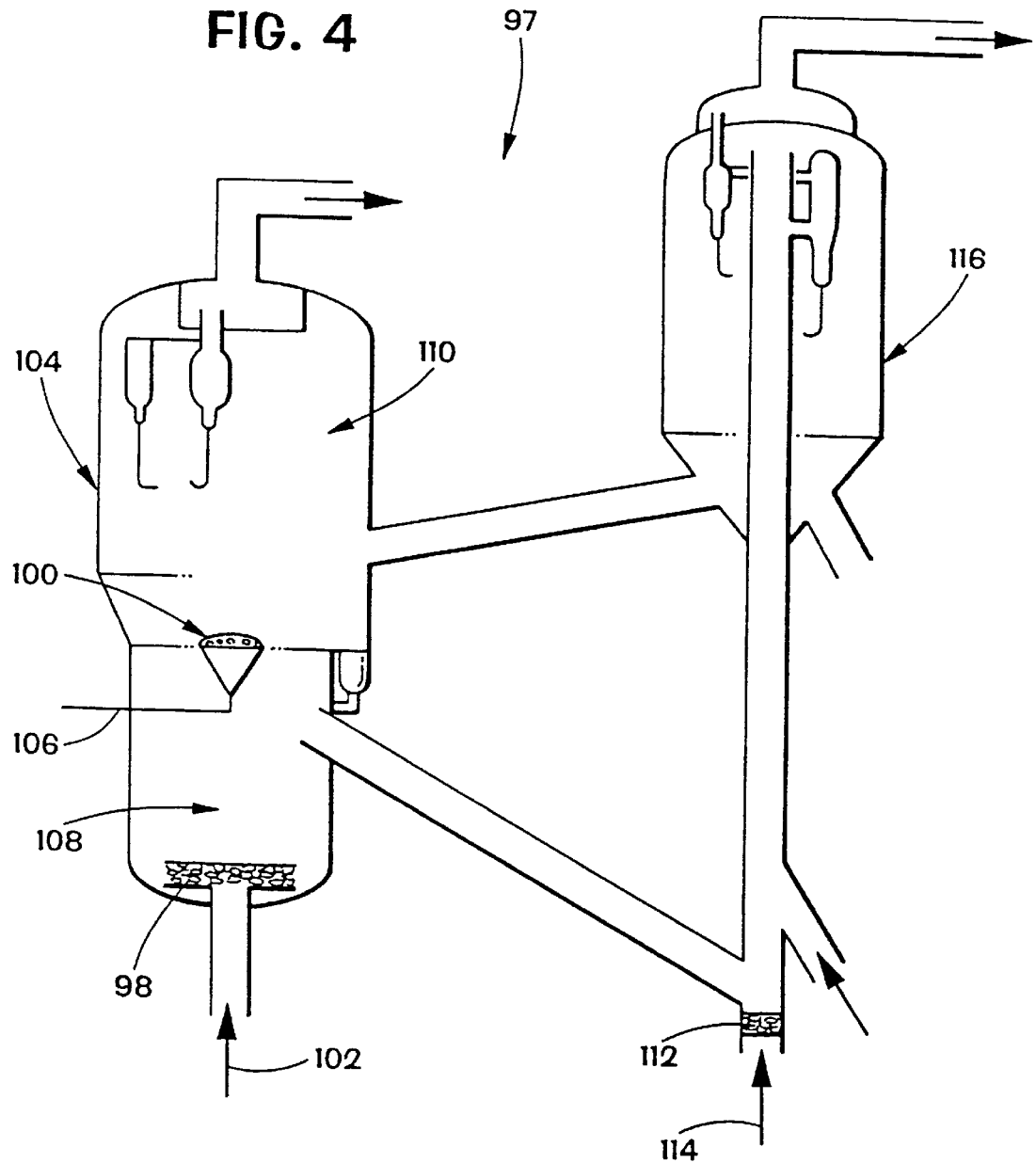
FIG. 4 is a partial cross-sectional side view of a two-stage regenerator fluidized bed reactor.

Alternatively, in FIG. 4 which depicts a conventional two-stage regenerator fluidized bed reactor 104, layers 98, 112 of the reticulated ceramic material 15 may be used similarly as discussed in FIG. 3 for a single-stage combustor or regenerator. The turbulent inlet air 102 to the combustor or regenerator first stage 108 is flowed through the layer 98 of reticulated ceramic material 15 to subdivide the stream, preferably into a plurality of smaller flowing streams. Preferably, the reticulated ceramic material 15 is a single circular disk 124 (FIG. 6) without the perforations 125; however it may be an oval or square sheet 121 (FIG. 9), or any geometric configuration desired including an assembled disk 134 (FIG. 10). Optionally, multiple disks 98, 112 (FIG. 4) may be used. Also, the disk 124 (FIG. 7) or sheet 121 (FIG. 9) may optionally contain perforations. Similarly, for the second-stage 110, the turbulent inlet air 106 may be flowed through the layer 100 of reticulated ceramic material 15 to subdivide the stream into a plurality of smaller flowing streams. The subdivision of the vapor or air flows may reduce the turbulence of the incoming vapor or air streams, thus reducing the compressor horsepower usage or allowing for an increase in flow rate, depending on the process constraints of the two-stage regenerator fluidized bed reactor 104, 116. A further advantage of the present invention is that the subdivided vapor or air flows may more uniformly distribute the vapor or air throughout the combustor or regenerator chambers 108, 110. In addition, another layer of reticulated ceramic material 112 may be used to uniformly distribute any fluffing vapors 114 used in the fluidized bed reactor 116.

Figure 5:
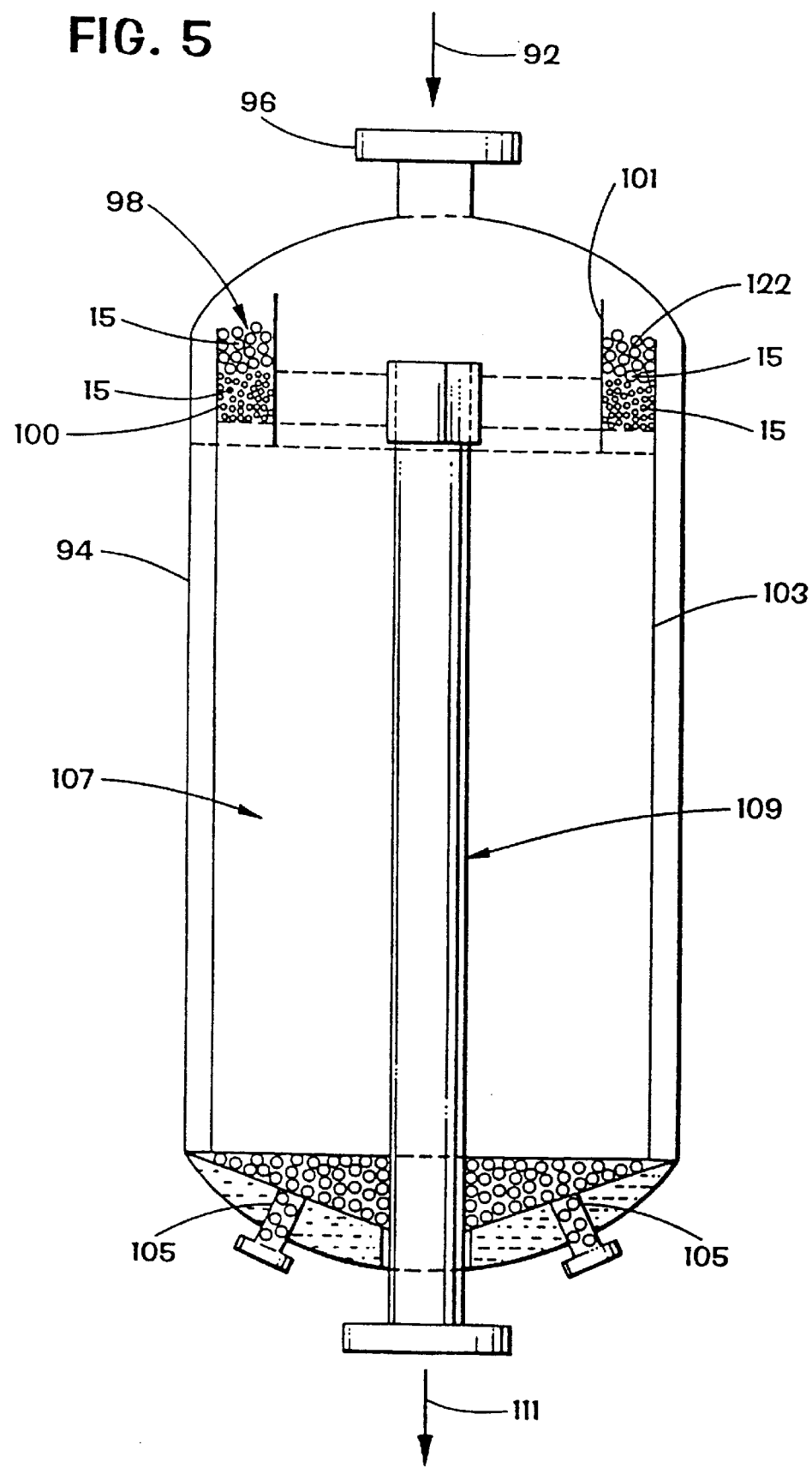
FIG. 5 is a partial cross-sectional side view of a radial flow reactor showing another embodiment of the present invention.

With reference to FIG. 5, for treatment of a contaminated organic-based feed in vapor form, a radial flow fixed bed chemical reactor 94 with reticulated ceramic material 15 in the shape of substantially spherical balls 122 (FIG. 11) is illustrated, although as previously discussed, other shapes may be used. The contaminated organic-based feed in vapor form 92 will enter the radial flow reactor 94 at the inlet 96. A layer 98 of reticulated ceramic material 15, more preferably layers 98, 100 of reticulated ceramic material 15, is provided in the vessel between the deflection baffle 102 and the scallop 104. The layers of 98, 100 reticulated ceramic material 15 aid in filtering contaminants such as entrained dirt, iron oxide, iron sulfide, asphaltenes, coke fines, catalyst fines, sediments, or other foreign particulate material entrained in the contaminated organic-based vapor feed 92 before reaction in the fixed catalyst bed 108 and discharge through the center pipe 110 as the reacted organic stream 112. Also as previously discussed, an advantage of the present invention is that the reticulated ceramic material 15 may be used to capture and retain catalyst from outlet streams, shown here in the unloading tubes 106.

Figure 12:
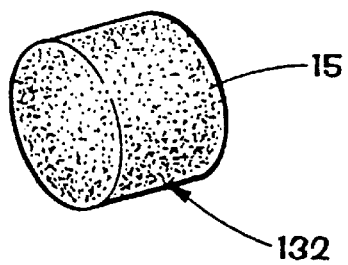
FIG. 12 is a perspective view of a solid cylinder made of reticulated ceramic material in accordance with the present invention.
Figure 13:
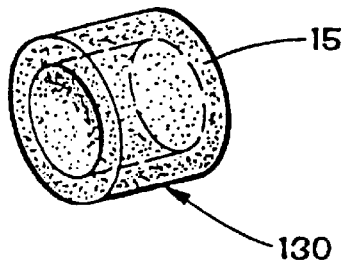
FIG. 13 is a perspective view of a hollow cylinder made of reticulated ceramic material in accordance with the present invention.

FIG. 6 illustrates a specific embodiment of the present invention as a reticulated ceramic material disk 124. Optionally, the disks may have perforations 125. Preferably, multiple perforations are used to accommodate screen baskets which may optionally be filled with reticulated ceramic material. Other shapes may include saddles 126 (FIG. 7), hollow cylinders 128 (FIG. 8), single sheets 121 of reticulated ceramic material 15 (FIG. 9), disks 134 formed from a plurality of segments 134a–f (FIG. 10), substantially spherical balls 122 (FIG. 11), solid cylinders 132 (FIG. 12), and raschig rings 130 (FIG. 13). Each shape may be sized to individual specifications. Sizes for the shapes used may include substantially spherical balls of about ⅛ to 2 inch diameters; raschig rings with inside diameters of about ⅛ to 1 inch and outside diameters of about ¼ to 1½ inches and heights of about ¼ to 2 inches; saddle shapes with radii of about ¼ to 2 inches; hollow cylinders having inside diameters of about ⅛ to 1¼ inches, outside diameters of about ¼ to 2 inches, and heights of about ¼ to 3 inches; and solid cylinders having diameters of about ⅛ to 1 inch and heights of about ¼ to 2 inches. Custom-made one-piece disks 124 or single sheet 121 construction may be custom-fit to the physical configuration of a reactor. A further feature of this aspect of the present invention is that the reticulated ceramic material 15 may be formed in either a disk 124 or single sheet 121 having perforations 125. An additional feature of the present invention is that the reticulated ceramic material when constructed may be formed into a plurality of segments in order to form an assembled sheet or disk that is custom-fit to the reactor's physical configuration. Porosities of the reticulated ceramic material may range from 10 to 800 ppi. Preferably, the pore distribution may range from about 10 to 80 ppi. More preferably, the pore distribution may range from about 20 to 60 ppi. This enables customization of the size and shape of the reticulated ceramic material 15 for the application, size, particulate loading and pressure drop constraints. The ceramic material surrounding the pores, or openings, of the reticulated ceramic material is from the web members 123 (FIG. 9) which in turn define the flow passageways 120 (FIG. 9).

Another specific embodiment of this invention is directed to any one of the methods described above, wherein the reticulated ceramic material has an average pore size of about 100 to 150 microns. Preferably, the ceramic material has a narrow pore distribution, broadly being about 300 to 700 pores per linear inch, more narrowly being about 450 to 600 pores per linear inch. A ceramic material meeting these specifications is commercially available from SELEF Corporation and/or its subsidiary, Porvair Advanced Materials, Inc. of Hendersonville, N.C., sold under the brand name "GPM" or "GPM Porous Ceramics." In addition, the cell-to-cell window size of the material ranges from 10–25 microns, with 100–400 windows per inch. Specific GPM ceramic materials have 600 pores per inch at 10% density and 350 windows per inch, 500 pores per inch at 20% density and 150 windows per inch and 450 pores per inch at 30% density and 130 windows per inch. The chemical composition of the GPM is $ZRO_2/Al_2O_3$, preferably being about 90% $ZRO_2$ and 10% $Al_2O_3$.

It is to be understood that the invention is not to be limited to the exact details of construction, operation, exact materials, or embodiments shown and described, as obvious modifications and equivalents will be apparent to one skilled in the art. For example, special liquid distributors or conventional liquid distributors could be used to facilitate the spreading of the liquid across the catalyst bed; however, the reticulated ceramic material could be used only for particulate removal. Accordingly, the invention is therefore to be limited only by the reference to the appended claims, including any equivalents.

What is claimed:

1. A method of removing contaminants from a contaminated organic-based feed stream in a chemical reactor, comprising the steps of:

(a) providing a layer of reticulated ceramic material in a chemical reactor, the reticulated ceramic material having an average pore size of about 100 to about 150 microns, the layer of reticulated ceramic material being in an amount sufficient to filter the contaminant from the contaminated organic-based feed stream; and (b) passing the contaminated organic-based feed stream through the layer of reticulated ceramic material.

2. A method of removing contaminants from a contaminated organic-based feed stream in a chemical reactor, comprising the steps of:

(a) providing a layer of a reticulated ceramic material, the reticulated ceramic material having an average pore size of about 100 to about 150 microns; and (b) contacting the contaminated organic-based feed stream with the reticulated ceramic material to remove the contaminants from the contaminated organic-based feed stream.

3. The method of claim 2, including the step of providing a decontaminated organic-based feed stream for further processing in the chemical reactor.

4. The method of claim 2, wherein the reticulated ceramic material has a pore distribution range of about 300 to 700 pores per linear inch.

5. The method of claim 2, wherein the reticulated ceramic material has a pore distribution range of about 450 to 600 pores per linear inch.

6. The method of claim 2, wherein the reticulated ceramic material is formed into a plurality of hollow cylinders.

7. The method of claim 2, wherein the chemical reactor is selected from the group consisting of a hydrotreater reactor, a hydrorefiner, a hydrocracker reactor, a reformer reactor, an alkylation reactor, an isomerization reactor and a polymerization reactor.

8. The method of claim 2, wherein the reticulated ceramic material has a substantially uniform coating of a selected catalyst including a porous alumina coating with one Group VI-B metal or one Group VIII metal.

9. The method of claim 8, wherein the Group VI-B metal is molybdenum.

10. The method of claim 8, wherein the Group VIII metal is nickel or cobalt.

11. The method of claim 2, wherein a Group VI-B metal or a Group VIII metal is impregnated into the reticulated ceramic material.

12. The method of claim 2, wherein the reticulated ceramic material comprises a porous inorganic oxide selected from the group consisting of alumina, silica, silica-alumina, magnesia, silica-magnesia, titania and zirconium.

13. A method of fluid distribution in a chemical reactor comprising the steps of:

(a) providing a layer of reticulated ceramic material in the chemical reactor, the reticulated ceramic material having an average pore size of about 100 to about 150 micons defined by a plurality of web members forming a plurality of flow passageways through the reticulated ceramic material;

(b) contacting an organic-based feed stream with the layer of material; and (c) subdividing the organic-based feed stream into a plurality of smaller fluid streams by passing the organic-based feed stream through the plurality of flow passageways formed by the web members of the reticulated ceramic material.

14. The method of claim 13 including the steps of: removing contaminants from a contaminated organic-based feed stream; and providing a decontaminated and uniformly spread organic-based feed stream to a catalyst bed for further processing in the chemical reactor.

15. The method of claim 14 including the steps of: providing a hydrogen rich stream to contact the organic-based feed stream; and removing iron particulates and organically bound iron form a contaminated organic-based feed stream.

16. A method of removing organically bound iron contaminants from an organic-based feed stream comprising contacting the feed stream in the presence of hydrogen with a layer of reticulated ceramic material, the reticulate ceramic material having an average pore size of about 100 to about 150 microns, and organic-based feed stream being selected from the group consisting of organically bound iron contaminated petroleum crude oil, topped or reduced crude oil, solvent deasphalted oil, distillate, heavy cycle stocks, visbreaker liquid effluent, atmospheric and vacuum crude tower bottoms, shale oils, coal tars and tar sand oils.

* * * * *

UNITED STATES PATENT AND TRADEMARK OFFICE
CERTIFICATE OF CORRECTION

PATENT NO. : 6,291,603 B1
DATED : September 18, 2001
INVENTOR(S) : John N. Glover It is certified that error appears in the above-identified patent and that said Letters Patent is hereby corrected as shown below:

<u>Title page,</u>
Item [63], Related U.S. Application Data, delete "(63) Continuation-in-part of application No. 09/116,863, filed on Jul. 16, 1998, now abandoned" and insert -- (63) Continuation-in-part of application No. 09/116,863, filed on Jul. 16, 1998, now U.S. Pat. No. 6,258,900 -- therefor.

Signed and Sealed this

Twenty-eighth Day of October, 2003

JAMES E. ROGAN
*Director of the United States Patent and Trademark Office*